United States Patent
Hatano (10) Patent No.: US 8,806,937 B2
(45) Date of Patent: Aug. 19, 2014

(54) TEMPERATURE SENSOR SUPPORTING DEVICE AND TEMPERATURE SENSOR ATTACHMENT STRUCTURE

(71) Applicant: Denso Corporation, Kariya (JP)

(72) Inventor: Makoto Hatano, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 13/740,536

(22) Filed: Jan. 14, 2013

(65) Prior Publication Data

US 2013/0195144 A1    Aug. 1, 2013

(30) Foreign Application Priority Data

Jan. 27, 2012  (JP) .................................. 2012-015532

(51) Int. Cl.
  *G01D 11/24*  (2006.01)
  *G01L 19/14*  (2006.01)
  *G01P 1/02*   (2006.01)
  *G01K 1/14*   (2006.01)

(52) U.S. Cl.
  CPC .............. *G01K 1/14* (2013.01); *G01K 2201/02* (2013.01)
  USPC ........................................................ 73/431

(58) Field of Classification Search
  USPC ......................................... 374/208, 141, 148
  See application file for complete search history.

(56) References Cited

U.S. PATENT DOCUMENTS

| 7,153,024 B2* | 12/2006 | Usui .............................. 374/208 |
| 8,033,718 B2* | 10/2011 | Nishiyashiki ................. 374/141 |
| 2006/0162350 A1* | 7/2006 | Shiraishi et al. ................ 62/125 |
| 2009/0296782 A1* | 12/2009 | Nishiyashiki ................. 374/208 |

FOREIGN PATENT DOCUMENTS

| JP | 61-136275 | 8/1986 |
| JP | 10-291414 | 11/1998 |
| JP | 11-148697 | 6/1999 |
| JP | 2002-303469 | 10/2002 |
| JP | 2004-020167 | 1/2004 |
| JP | 2005-326367 | 11/2005 |
| JP | 2006-200874 | 8/2006 |
| JP | 2009-293821 | 12/2009 |

OTHER PUBLICATIONS

Office Action issued Jan. 27, 2014 in corresponding JP Application No. 2012-015532 (with English translation).

* cited by examiner

*Primary Examiner* — Lisa Caputo
*Assistant Examiner* — Jamel Williams
(74) *Attorney, Agent, or Firm* — Harness, Dickey & Pierce, P.L.C.

(57) ABSTRACT

A temperature sensor supporting device includes a supporting body having first and second groove portions, a separation preventive part, and a pair of harnesses connected to a temperature sensor. The first groove portion is set to have such a groove width size as to permit clamping of proximal end parts of the harnesses inward of the supporting body when the proximal end parts are viewed as a single overlapping line from a first angle. The second groove portion is set to have such a groove width size as to permit clamping of intermediate parts of the harnesses inward of the supporting body when the intermediate parts are viewed as two lines from a second angle. The proximal end parts and the intermediate parts are clamped respectively in the first and second groove portions so that the sensor is positioned and fixed with the sensor disposed outside the supporting body.

10 Claims, 5 Drawing Sheets

TEMPERATURE SENSOR SUPPORTING DEVICE AND TEMPERATURE SENSOR ATTACHMENT STRUCTURE

CROSS REFERENCE TO RELATED APPLICATION

This application is based on Japanese Patent Application No. 2012-15532 filed on Jan. 27, 2012, the disclosure of which is incorporated herein by reference.

TECHNICAL FIELD

The present disclosure relates generally to a temperature sensor supporting device. In particular, the present disclosure relates to a temperature sensor supporting device that is suitable for a temperature sensor for measuring temperature of an evaporator in an air conditioning system for a vehicle.

BACKGROUND

For a temperature sensor supporting device of this type, a device configured such that a separation preventive part is provided in a projecting manner for a supporting body which supports a temperature sensor, and the separation preventive part is inserted between fins of an evaporator in an air conditioning system for a vehicle, the separation of the supporting body from the fins being thereby prevented despite vibration of the vehicle, for example, is known (see JP-A-2009-293821 corresponding to US2009/0296782A1).

The temperature sensor supporting device described in JP-A-2009-293821 is configured, such that the temperature sensor including a thermistor, which is a support object, is accommodated in a metal cylindrical member, and the temperature sensor is supported by a holder (supporting body) via the cylindrical member. Accordingly, to limit the separation of the cylindrical member from the holder, it is necessary that a small diameter part having a shape whose diameter is reduced in a tapered manner should be formed at a harness-side end portion of the cylindrical member; on the other hand, a tapered through hole corresponding to the shape of the cylindrical member should be provided, and a pawl part engaged with an upper end surface of the cylindrical member should be provided for the holder. As a result, a structure of the holder for restricting the separation of the cylindrical member becomes complicated.

SUMMARY

The present disclosure addresses at least one of the above issues.

According to the present disclosure, there is provided a temperature sensor supporting device for supporting a temperature sensor that is inserted between fins of an evaporator in an air conditioning system for a vehicle and that measures temperature of the evaporator through the fins. The supporting device includes a supporting body, a separation preventive part, and a pair of harnesses. The supporting body supports the temperature sensor. The separation preventive part has a linear elongated shape and is formed to project from the supporting body. The separation preventive part is inserted between the fins to restrict separation of the separation preventive part from the fins. The pair of harnesses are connected to the temperature sensor to supply an electric current to the temperature sensor. The supporting body includes a first groove portion and a second groove portion. The first groove portion is formed parallel to the separation preventive part, and is set to have such a groove width size as to permit clamping of respective proximal end parts of the pair of harnesses inward of the supporting body in a state where the proximal end parts are viewed as a single overlapping line from a first angle. The second groove portion is formed to intersect with the separation preventive part. The pair of harnesses respectively include intermediate parts which extend integrally from the proximal end parts and which are bent relative to the proximal end parts in the first groove portion. The second groove portion is set to have such a groove width size as to permit clamping of the intermediate parts inward of the supporting body in a state where the intermediate parts are viewed as two lines from a second angle that is generally perpendicular to the first angle. The proximal end parts and the intermediate parts are clamped respectively in the first groove portion and the second groove portion so that the temperature sensor is positioned and fixed with the temperature sensor disposed outside the supporting body.

According to the present disclosure, there is also provided a temperature sensor attachment structure for attaching a rod-shaped temperature sensor to an evaporator in an air conditioning system for a vehicle. The attachment structure includes a pair of harnesses and a supporting body. The pair of harnesses are joined to one end part of the temperature sensor. The supporting body includes a separation preventive part, a first groove portion, and a second groove portion. The separation preventive part is inserted between fins of the evaporator. The first groove portion extends parallel to the separation preventive part. The second groove portion extends in a direction intersecting with the first groove portion. The pair of harnesses are clamped and fixed by the first groove portion and the second groove portion so that the one end part of the temperature sensor is positioned on an extending end face of the first groove portion and that the temperature sensor is fixed parallel to the separation preventive part.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be described below with reference to the accompanying drawings.

First Embodiment

As illustrated in FIGS. 1 to 4, a temperature sensor supporting device 1 of a first embodiment has a function of supporting a temperature sensor 10 that is inserted between fins 2 (see FIGS. 7 and 8) of an evaporator in an air conditioning system for a vehicle (heating ventilation & air conditioning (HVAC) system) so as to measure temperature of the evaporator through the fins 2. The device 1 includes a supporting body 20 which is its primary member.

Figure 5:
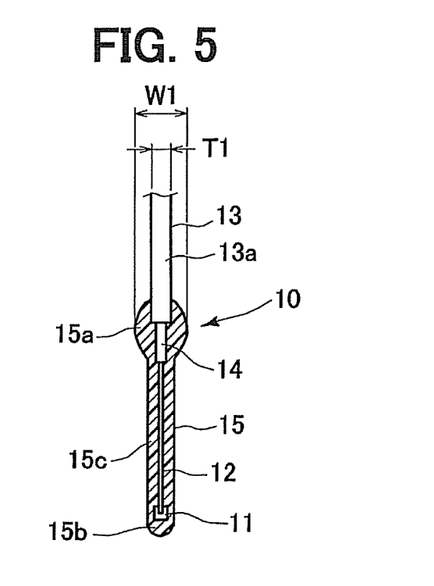
FIG. 5 is a sectional view illustrating the temperature sensor in FIG. 1.
Figure 6:
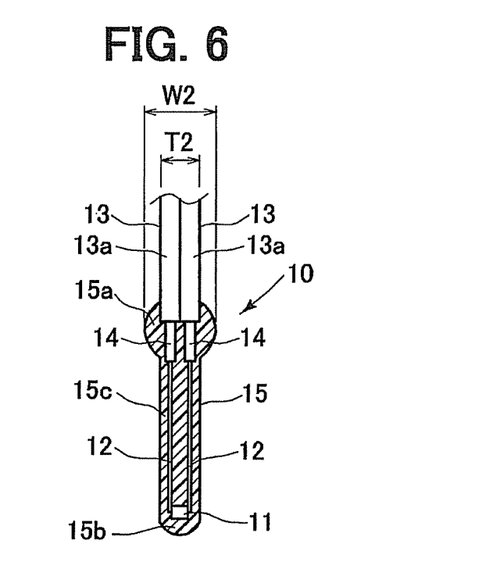
FIG. 6 is a left side view of FIG. 5.

As illustrated in FIGS. 5 and 6, the temperature sensor 10 is configured as a sensor assembly including, for example, a thermistor 11 (abbreviation for a thermally sensitive resistor) which is a semiconductor device whose resistance varies according to temperature. The temperature sensor 10 is formed in a shaft shape which is circular in cross-section as a result of the thermistor 11 being coated with a resin 15 (e.g., epoxy resin) together with a pair of lead wires 12, and solder joining portions 14 to harnesses 13 corresponding respectively to the lead wires 12. Each harness 13 is an electric wire (cable) having a known structure in which an electric conductor is covered with an insulating material.

As described above, the temperature sensor 10 is coated with the resin 15 because the thermistor 11 is not in contact with dew condensation water of the evaporator. As a consequence of the resin coating, the temperature sensor 10 is formed such that an outer diameter of a rear end part 15a corresponding to a region in which the solder joining portion 14 is incorporated and which is close to a proximal end part 13a of each harness 13 is larger than a region from a leading end part 15b to an intermediate part 15c.

Specifically, the rear end part 15a of the temperature sensor 10 is formed in a spherical shape, and an end surface of the leading end part 15b of the temperature sensor 10 is formed in a spherical surface shape. The "spherical shape" does not mean a strict sphere, but broadly includes, for example, those having elliptical cross section. Similarly, the "spherical surface shape" does not mean a strict spherical surface, but broadly includes, for example, those having elliptical cross section.

In this case, when the proximal end parts 13a of the pair of harnesses 13 are seen in a state of a single overlapping line as illustrated in the frontal vision of the sensor 10 in FIG. 5, a size W1 of the outer diameter of the rear end part 15a of the temperature sensor 10 is larger than a wire diameter T1 of a single line of the pair of harnesses 13. When the proximal end parts 13a of the pair of harnesses 13 are seen in a state of two lines as illustrated in the lateral side vision of the sensor 10 in FIG. 6, a size W2 of the outer diameter of the rear end part 15a of the temperature sensor 10 is larger than a size T2 of widths of the pair of harnesses 13 (=T1×2 (size of two single lines)).

Figure 7:
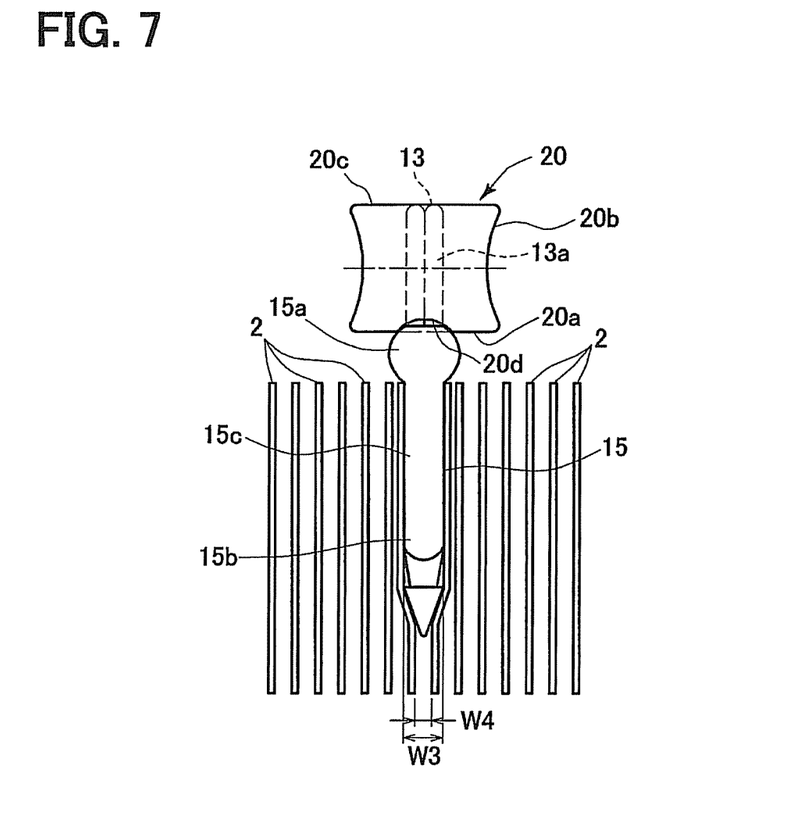
FIG. 7 is a left side view illustrating a state in which the temperature sensor is inserted between fins of an evaporator according to the first embodiment.

A size W3 of an outer diameter of the leading end part 15b (intermediate part 15c) of the temperature sensor 10 is formed to be larger than a clearance W4 between the fins 2 of the evaporator to such an extent that the insertion of the leading end part 15b (intermediate part 15c) is permitted (see FIG. 7). Since the end surface of the leading end part 15b of the temperature sensor 10 is formed into a spherical surface shape, the leading end part 15b and the intermediate part 15c of the temperature sensor 10 can be inserted easily between the fins 2 of the evaporator. The separation of the sensor 10 is restricted after the insertion of the sensor 10 between the fins 2 of the evaporator.

The size W2 of the outer diameter of the rear end part 15a of the temperature sensor 10 is formed to be larger than the clearance W4 between the fins 2 of the evaporator to such an extent that the insertion of the rear end part 15a is prevented. Accordingly, the rear end part 15a of the temperature sensor 10 cannot be inserted between the fins 2 of the evaporator, and the rear end part 15a of the temperature sensor 10 is thereby disposed outside the fins 2.

With reference back to FIGS. 1 to 4, the supporting body 20 is a block that is formed in a shape of a generally rectangular parallelepiped from thermosetting resin or thermoplastic resin, and a separation preventive part 21 having a linear longitudinal shape is formed to project from one end part of a lower part 20a on a lower side in FIG. 1. As illustrated in its lateral side vision in FIG. 4, the separation preventive part 21 includes inclined plane parts 21a having a shape of a saw blade that is symmetric with respect to a central line L in a longitudinal direction of the part 21. Each inclined plane part 21a has a tapered shape whose diameter is reduced in a direction from its proximal end side to distal end side.

Figure 8:
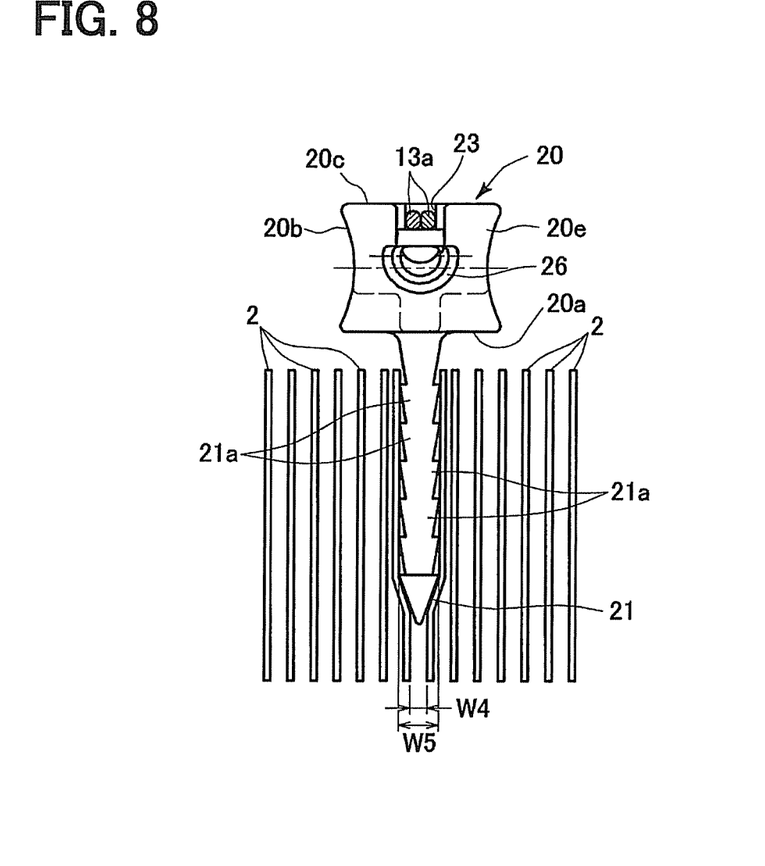
FIG. 8 is a right side view illustrating a state in which the temperature sensor supporting device is inserted between the fins of the evaporator according to the first embodiment.

A size W5 of a maximum thickness between the opposed inclined plane parts 21a is larger than the clearance W4 between the fins 2 of the evaporator to the extent that the insertion of the opposed inclined plane parts 21a is permitted (see FIG. 8). Accordingly, the separation preventive part 21 can be easily inserted between the fins 2 of the evaporator. The separation of the part 21 is restricted after the insertion of the part 21 between the fins 2 of the evaporator.

Figure 1:
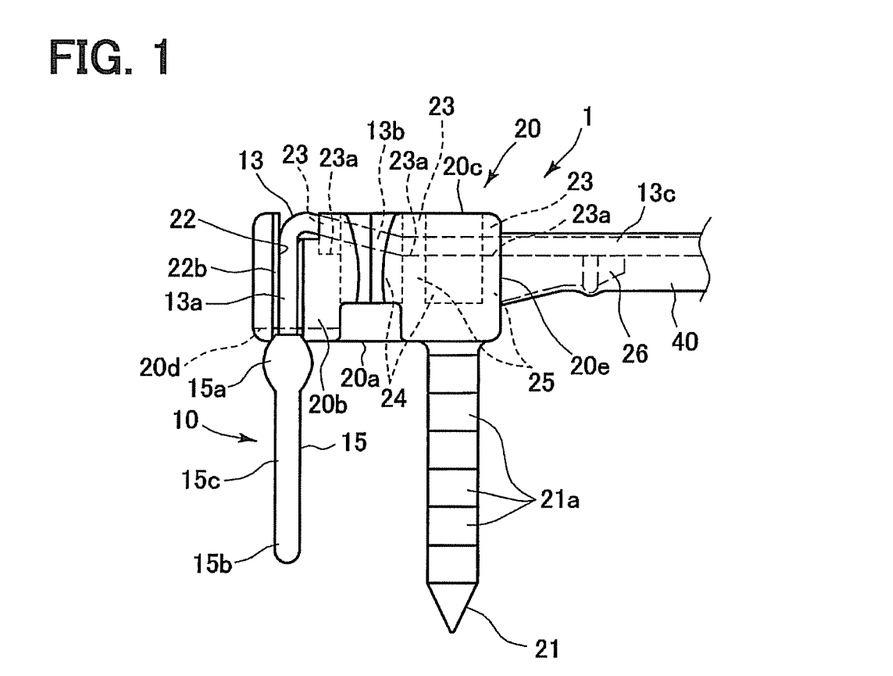
FIG. 1 is a front view illustrating a state in which a temperature sensor is attached to a temperature sensor supporting device in accordance with a first embodiment.
Figure 2:
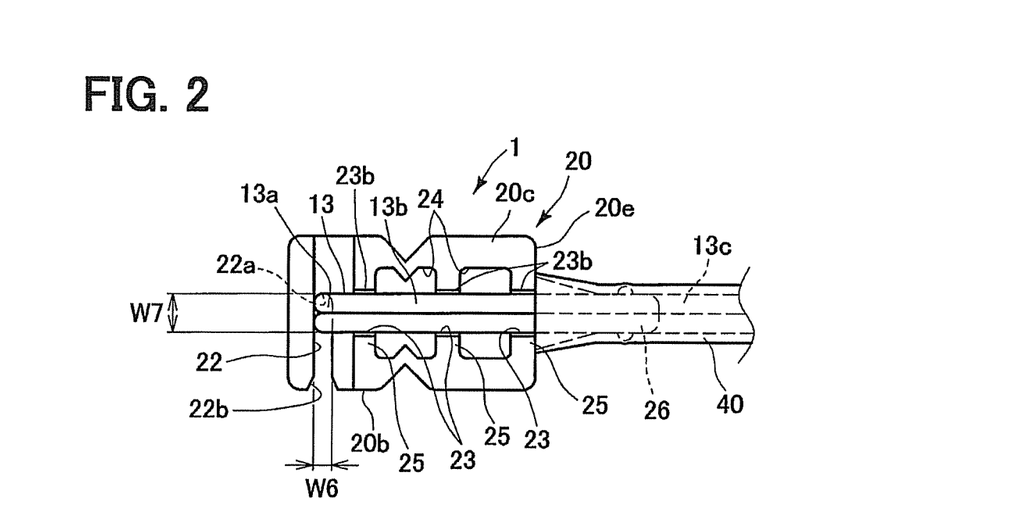
FIG. 2 is a plan view of FIG. 1.

As illustrated in FIGS. 1 and 2, the supporting body 20 includes a first groove portion 22 and a second groove portion 23 that serve a function of accommodating the pair of harnesses 13 with their portions divided. Specifically, the first groove portion 22 accommodates the proximal end parts 13a of the pair of harnesses 13, and the second groove portion 23 accommodates intermediate parts 13b of the pair of harnesses 13.

More specifically, the first groove portion 22 opens on a front part 20b-side of the supporting body 20 in FIG. 1, and is parallel to the separation preventive part 21 (upper and lower directions in FIG. 1). The first groove portion 22 is set to have such a groove width as to permit clamping of the parts 13a inward of the portion 22 (toward a back side of the body 20 in FIG. 1) when the proximal end parts 13a of the pair of harnesses 13 are in a state of a single overlapping line. Therefore, a size W6 of the groove width of the first groove portion 22 is slightly smaller than the wire diameter T1 of the single line of the pair of harnesses 13. In addition, "being parallel to the separation preventive part 21" does not mean that the first groove portion 22 is strictly parallel to the part 21, but includes, for example, a direction shifted by about 45 degrees from the direction of the central line L of the separation preventive part 21.

Accordingly, when the pair of harnesses 13 are press-fitted (light pressure) into the first groove portion 22 by a predetermined force or larger, the first groove portion 22 is elastically deformed in a direction in which its groove width increases. As a result, the proximal end parts 13a of the pair of harnesses 13 are displaced toward a groove bottom 22a, and is accommodated in a state to be disposed on the groove bottom 22a. In this case, an opening 22b of the first groove portion 22 functions as a guide part whose diameter increases in a tapered manner in a direction outward of the portion 22 (front direction in FIG. 1) to facilitate the clamping of the harnesses 13.

The second groove portion 23 opens oh an upper part 20c side of the supporting body 20 in FIG. 1, and is perpendicular to the separation preventive part 21 (rightward and leftward directions in FIG. 1). The portion 23 is set to have such a groove width as to permit clamping of the parts 13b inward of the portion 23 (lower direction in FIG. 1) when the intermediate parts 13b of the pair of harnesses 13 are seen in a state of two lines. Therefore, a size W7 of the groove width of the second groove portion 23 is slightly smaller than a size T2 of a horizontal width of the pair of harnesses 13. In addition, "being perpendicular to the separation preventive part 21" does not mean, for example, that the second groove portion 23 is strictly perpendicular to the direction of the central line L of the separation preventive part 21, but includes an angle shifted by about 45 degrees from an angle intersecting with the direction of the central line L at a right angle.

In this first embodiment, a thinned part 24 in a shape of a blind hole with a bottom that opens on the upper part 20c-side in FIG. 1 (opens on a near side in FIG. 2) is provided for the supporting body 20. The second groove portion 23 is formed on a groove formation wall 25 (it is illustrated in FIGS. 1 and 2 that three groove formation walls 25 are provided) of peripheral walls surrounding the thinned part 24 that is parallel to the first groove portion 22 by by a planar view of the body 20.

Accordingly, when the pair of harnesses 13 are press-fitted (light pressure) into the second groove portion 23 by a predetermined force or larger, the second groove portion 23 is elastically deformed in a direction in which its groove width increases. As a result, the intermediate parts 13b of the pair of harnesses 13 are displaced toward a groove bottom 23a to be accommodated in the portion 23 with the parts 13b disposed on the groove bottom 23a. In this case, an opening 23b of the second groove portion 23 functions as a guide part whose diameter increases in a tapered manner in a direction outward of the portion 23 (upper direction in FIG. 1) to facilitate the clamping of the harnesses 13.

Figure 3:
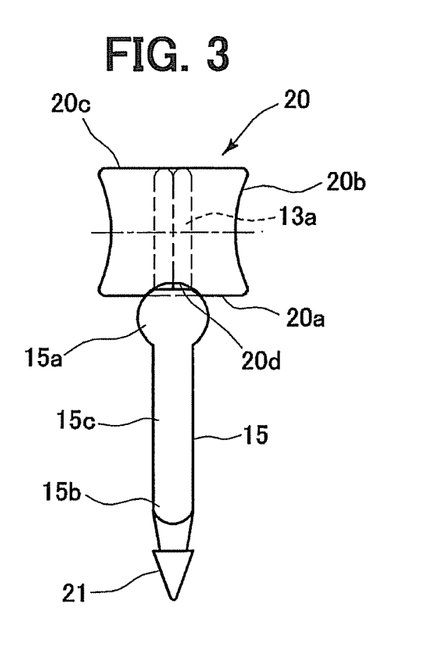
FIG. 3 is a left side view of FIG. 1.

As illustrated in FIGS. 1 and 3, a recessed part 20d having a curved surface that is in surface contact with the rear end part 15a of the temperature sensor 10 is formed at the lower part 20a of the supporting body 20. The recessed part 20d is formed to be perpendicular to the first groove portion 22 and to be parallel to the second groove portion 23, and has a function of positioning a posture of the rear end part 15a, such that the temperature sensor 10 is arranged in parallel with the separation preventive part 21.

Figure 4:
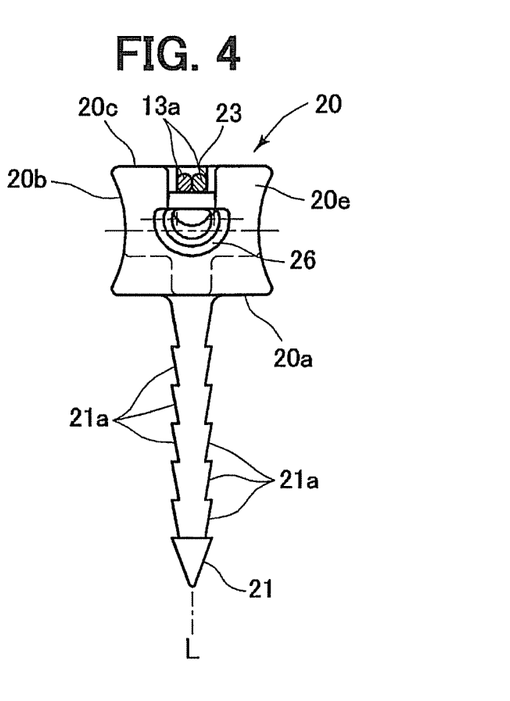
FIG. 4 is a right side view of FIG. 1.

As illustrated in FIGS. 1 and 2, a mounting part 26 that holds in a horizontal posture distal end parts 13c of the pair of harnesses 13, which extend out integrally from the intermediate parts 13b of the pair of harnesses 13, is formed in a projecting manner at a lateral part 20e of the supporting body 20. The distal end parts 13c of the pair of harnesses 13 are covered with a vinyl tube 40 along with the mounting part 26. Accordingly, the harness 13 is not separated by itself from the supporting body 20. In FIGS. 4 and 8, the vinyl tube 40 is omitted.

When the temperature sensor 10 is attached to the above-configured temperature sensor supporting device 10, first, the proximal end parts 13a of the pair of harnesses 13 are clamped by the first groove portion 22 of the supporting body 20 to be disposed on the groove bottom 22a. Next, the harness 13 is pulled upward to bring the rear end part 15a of the temperature sensor 10 into surface contact with the recessed part 20d of the supporting body 20.

In this case, because the size W1 of the outer diameter of the rear end part 15a of the temperature sensor 10 in a direction of the groove width of the first groove portion 22 is larger than the size W6 of the groove width of the first groove portion 22 (W1>T1>W6), even if the harness 13 is pulled upward by a large force, the rear end part 15a of the temperature sensor 10 does not enter into the first groove portion 22, and the rear end part 15a is held in surface contact with the recessed part 20d of the supporting body 20.

Then, the harnesses 13 are pulled in a direction that is perpendicular to the proximal end parts 13a with the temperature sensor 10 arranged parallel to the separation preventive part 21, and the intermediate parts 13b are thereby clamped by the second groove portion 23 to be disposed on the groove bottom 23a. Accordingly, the temperature sensor 10 can be attached to the temperature sensor supporting device 1 via the pair of harnesses 13 (see FIG. 1).

With regard to the temperature sensor supporting device 1 to which the temperature sensor 10 is attached, when the temperature sensor 10 and the separation preventive part 21 of the supporting body 20 are inserted between the fins 2 of the evaporator, since the size W1 of the outer diameter of the rear end part 15a of the temperature sensor 10 is larger than the size W6 of the groove width of the first groove portion 22 as described above, even if great frictional resistance is caused at the time of the insertion of the temperature sensor 10 between the fins 2 of the evaporator, a positioning and fixation state of the temperature sensor 10 at the recessed part 20d is maintained. Thus, the temperature sensor 10 can be inserted between the fins 2 of the evaporator together with the separation preventive part 21.

According to the temperature sensor supporting device, the temperature sensor 10 is supported by the supporting body 20 by use of the pair of harnesses 13 connected to the temperature sensor 10. More specifically, the proximal end parts 13a and the intermediate parts 13b of the pair of harnesses 13 are clamped in the first groove portion 22 and the second groove portion 23 of the supporting body 20, respectively. Accordingly, the temperature sensor 10 is positioned and fixed in a state disposed outside the supporting body 20.

The temperature sensor attachment structure 1 is for attaching a rod-shaped temperature sensor 10 to an evaporator in an air conditioning system for a vehicle. The attachment structure 1 includes a pair of harnesses 13 and a supporting body 20. The pair of harnesses 13 are joined to one end part 15a of the temperature sensor 10. The supporting body 20 includes, a separation preventive part 21, a first groove portion 22, and a second groove portion 23. The separation preventive part 21 is inserted between fins 2 of the evaporator. The first groove portion 22 extends parallel to the separation preventive part 21. The second groove portion 23 extends in a direction intersecting with the first groove portion 22. The pair of harnesses 13 are clamped and fixed by the first groove portion 22 and the second groove portion 23 so that the one end part 15a of the temperature sensor 10 is positioned on an extending end face 20d of the first groove portion 22 and that the temperature sensor 10 is fixed parallel to the separation preventive part 21.

As evidenced by the above description, in this first embodiment, when the temperature sensor 10 is fixed to the supporting body 20, it is not necessary to insert the temperature sensor 10 through the supporting body 20. Accordingly, a cylindrical member conventionally used for a temperature sensor can be eliminated, and in a supporting body, a pawl part engaged with the cylindrical member can no longer be used. Moreover, a through hole of the supporting body does not need to be formed into a tapered shape in in conformity to a shape of the cylindrical member. As a result, the number of components can be reduced, and the structure of the supporting body 20 can be simplified. In the case of attachment of the temperature sensor 10 to the temperature sensor supporting device 1, the proximal end parts 13a and the intermediate parts 13b of the pair of harnesses 13 can be clamped in the first groove portion 22 and the second groove portion 23 of the supporting body 20, respectively. Therefore, their attachment performance can also be secured.

Although the thinned part 24 is provided for the supporting body 20 in the first embodiment, the temperature sensor supporting device 1 of the present disclosure is not limited to this configuration, and the thinned part 24 can be appropriately removed. In this case, a second groove portion having a continuous recessed shape is formed on the upper part 20c of the supporting body 20.

In the first embodiment, the rear end part 15a of the temperature sensor 10 is spherically formed. Accordingly, rotation of the rear end part 15a becomes easy along the curved surface of the recessed part 20d, and the positioning of the rear end part 15a at the recessed part 20d can thereby be facilitated. Nevertheless, the rear end part 15a of the temperature sensor 10 is not necessarily formed spherically. The shape of the part 15a can be appropriately changed as long as a width size of the part 15a is larger than the size W6 of the groove width of the first groove portion 22.

Second Embodiment

Figure 9:
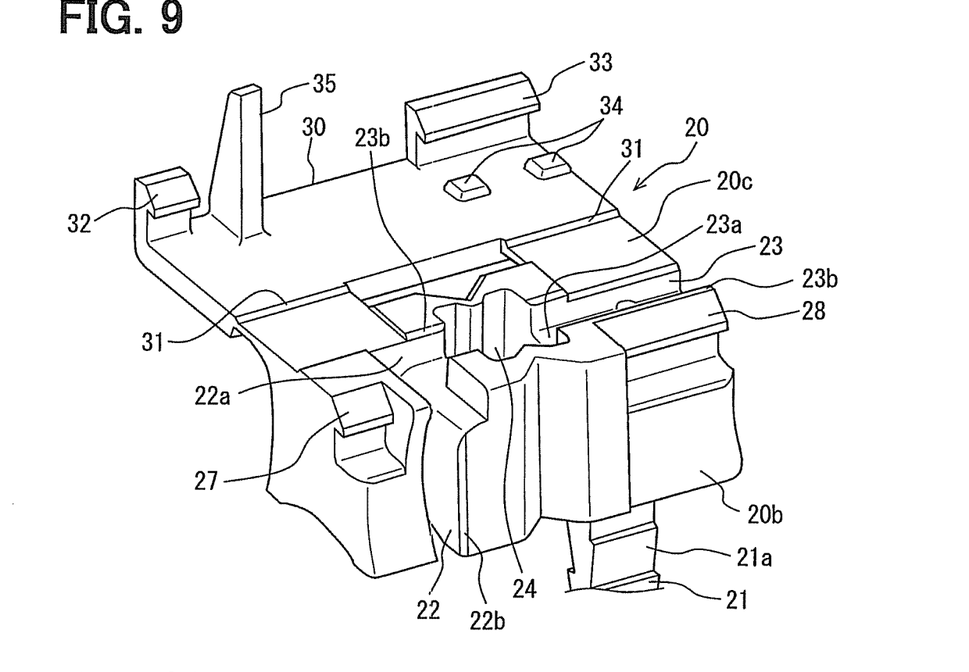
FIG. 9 is a perspective view illustrating an open state of a cover body in a temperature sensor supporting device in accordance with a second embodiment.
Figure 10:
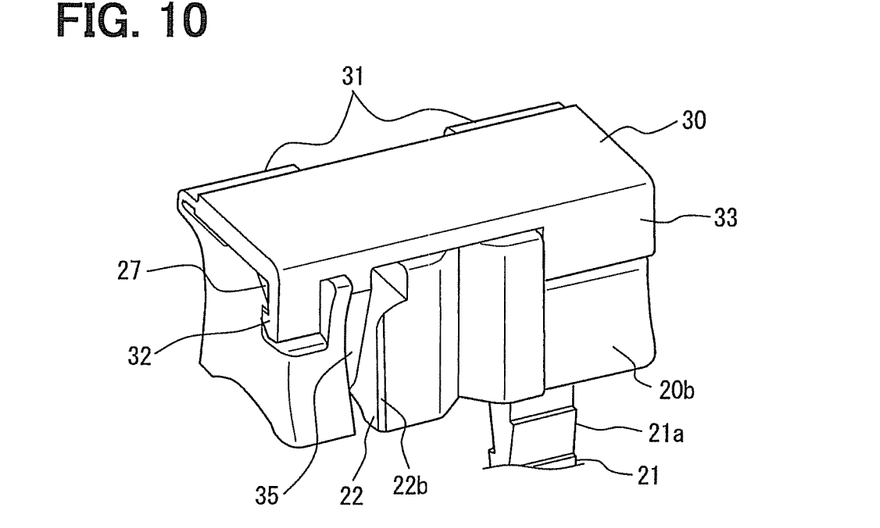
FIG. 10 is a perspective view illustrating a closed state of the cover body in the temperature sensor supporting device of the second embodiment.

In addition to the configuration of the above first embodiment, for example, a cover body 30 illustrated FIGS. 9 and 10 may be provided. The other configurations are approximately the same as the first embodiment. In FIGS. 9 and 10, descriptions of the same members and the parts having the same function as the first embodiment will be omitted using their corresponding numerals.

The cover body 30 is connected integrally to a supporting body 20 via a pair of hinge parts 31, and can open or close a second groove portion 23. Cover body side engagement parts 32, 33 which are snap-fit coupled respectively with supporting body side engagement parts 27, 28 are provided for the cover body 30.

Corresponding to the second groove portion 23 of the supporting body 20, projecting parts 34 (second projecting parts) are provided on a reverse side of the cover body 20 (it is illustrated in FIG. 9 that two projecting parts 34 are provided). With the cover body 30 closed, intermediate parts 13b of a pair of harnesses 13 are pressed gently by the projecting parts 34, and obstructed. Accordingly, separation of the harnesses 13 from the inside of the second groove portion 23 is prevented.

Moreover, corresponding to a first groove portion 22 of the supporting body 20, a projecting part 35 (first projecting part) is provided on the reverse side of the cover body 30. With the cover body 30 closed, proximal end parts 13a of the pair of harnesses 13 are pressed gently by the projecting part 35, and obstructed. Accordingly, separation of the harnesses 13 from the inside of the first groove portion 22 is prevented.

As a result of this second embodiment, the cover body 30 can be attached to the supporting body 20 in a single stroke, and by putting the cover body 30 into a closed state, a lift of the harnesses 13 from the supporting body 20 can be successfully prevented.

In the above second embodiment, the projecting parts 34 are provided on the reverse side of the cover body 30 corresponding to the second groove portion 23 of the supporting body 20. However, as a result of the intermediate parts 13b of the harnesses 13 being obstructed by the cover body 30 itself with the cover body 30 closed, the effect of preventing the lift of the harnesses 13 from the inside of the second groove portion 23 is expected. Thus, the projecting part 34 may be eliminated.

While the present disclosure been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A temperature sensor supporting device for supporting a temperature sensor that is inserted between fins of an evaporator in an air conditioning system for a vehicle and that measures temperature of the evaporator through the fins, the supporting device comprising:
   a supporting body that supports the temperature sensor;
   a separation preventive part that has a linear elongated shape and is formed to project from the supporting body, wherein the separation preventive part is inserted between the fins to restrict separation of the separation preventive part from the fins; and
   a pair of harnesses that are connected to the temperature sensor to supply an electric current to the temperature sensor, wherein:
   the supporting body includes:
      a first groove portion that is formed parallel to the separation preventive part and is set to have such a groove width size as to permit clamping of respective proximal end parts of the pair of harnesses inward of the supporting body in a state where the proximal end parts are viewed as a single overlapping line from a first angle; and
      a second groove portion that is formed to intersect with the separation preventive part;
   the pair of harnesses respectively include intermediate parts which extend integrally from the proximal end parts and which are bent relative to the proximal end parts in the first groove portion;
   the second groove portion is set to have such a groove width size as to permit clamping of the intermediate parts inward of the supporting body in a state where the intermediate parts are viewed as two lines from a second angle that is generally perpendicular to the first angle; and
   the proximal end parts and the intermediate parts are clamped respectively in the first groove portion and the second groove portion so that the temperature sensor is positioned and fixed with the temperature sensor disposed outside the supporting body; wherein
   the temperature sensor includes a rear end part that is coated with a resin and in direct contact with an extending end face of the supporting body.

2. The temperature sensor supporting device according to claim 1, wherein:
   the temperature sensor is coated with the resin and has a shape of a shaft;
   the rear end part of the temperature sensor is disposed adjacent the proximal end parts of the pair of harnesses; and
   a diameter size of the rear end part is set to be larger than its corresponding groove width size of the first groove portion.

3. The temperature sensor supporting device according to claim 2, wherein:

the rear end part of the temperature sensor is formed into a spherical shape; and the supporting body further includes a recessed part that is in surface-contact with the rear end part.

4. The temperature sensor supporting device according to claim 1, wherein:

the supporting body further includes a cover body that is capable of opening or closing the second groove portion and that is integrated with the supporting body in its closed state; and the intermediate parts of the pair of harnesses are obstructed by the cover body in the closed state of the cover body so that separation of the intermediate parts from the second groove portion is prevented.

5. The temperature sensor supporting device according to claim 4, wherein:

the cover body includes a projecting part corresponding to the first groove portion; and the proximal end parts of the pair of harnesses are obstructed by the projecting part in the closed state of the cover body so that separation of the proximal end parts from the first groove portion is prevented.

6. A temperature sensor attachment structure for attaching a rod-shaped temperature sensor to an evaporator in an air conditioning system for a vehicle, the attachment structure comprising:

a pair of harnesses that are joined to one end part of the temperature sensor; and a supporting body that includes:

a separation preventive part that is inserted between fins of the evaporator;

a first groove portion that extends parallel to the separation preventive part; and a second groove portion that extends in a direction intersecting with the first groove portion, wherein the pair of harnesses are clamped and fixed by the first groove portion and the second groove portion so that the one end part of the temperature sensor is positioned on an extending end face of the first groove portion and that the temperature sensor is fixed parallel to the separation preventive part; wherein the one end part (rear end part) of the temperature sensor is coated with a resin and in direct contact with an extending end face (recessed part) of the first groove portion.

7. The temperature sensor attachment structure according to claim 6, wherein the temperature sensor is attached to the temperature sensor supporting device from the first groove portion on a lateral side of the temperature sensor supporting device.

8. The temperature sensor attachment structure according to claim 6, wherein the pair of harnesses directly engage surface of the supporting body defining the first groove.

9. The temperature sensor supporting device according to claim 1, wherein the temperature sensor is attached to the temperature sensor supporting device from the first groove portion on a lateral side of the temperature sensor supporting device.

10. The temperature sensor supporting device according to claim 1, wherein the proximal end parts of the pair of harnesses directly engage surfaces of the supporting body defining the first groove.

* * * * *